United States Patent [19]

Butler

[11] Patent Number: 4,842,243

[45] Date of Patent: Jun. 27, 1989

[54] METHOD AND APPARATUS FOR MOLDING GOLF CLUB HEADS

[75] Inventor: Byron Butler, Newhall, Calif.

[73] Assignee: Lie Angle Solutions, Inc., West Chester, Ohio

[21] Appl. No.: 140,981

[22] Filed: Jan. 19, 1988

[51] Int. Cl.⁴ .......................... B22C 7/02; B28B 7/04
[52] U.S. Cl. ..................................... 249/124; 249/62; 249/142; 249/159; 249/160; 249/170; 249/177; 425/577; 264/221; 264/317; 164/35; 164/45; 164/246; 164/342; 273/167 G
[58] Field of Search .................. 164/34, 35, 36, 45, 164/246, 249, 137, 339, 340, 341, 342; 264/221, 317, 278; 249/61, 62, 142, 159, 175, 124, 160, 170, 177; 425/577; 273/167 G, 167 H

[56] References Cited

U.S. PATENT DOCUMENTS

| | | | |
|---|---|---|---|
| 4,160,635 | 7/1979 | Ikeda | 425/DIG. 5 |
| 4,326,326 | 4/1982 | MacDonald | 164/45 |
| 4,472,092 | 9/1984 | Schmidt | 164/45 |
| 4,630,825 | 12/1986 | Schmidt et al. | 164/35 |

Primary Examiner—Richard K. Seidel
Attorney, Agent, or Firm—Nemschoff & Supnik

[57] ABSTRACT

Apparatus for molding hollow metalwood golf club heads of wax or other material with variations in the lie angle of the neck or hosel relative to the body of the club head, in which two molds with communicating mold cavities are supported for turning of one mold about a pivotal axis to change the angular relationship of the two cavities. The molds have arcuate abutting surfaces coaxial with the pivot for effective meeting relationships in the different positions, the hosel base being slightly oversize to accommodate the displacement, and two core pieces in the molds have part-spherical abutting surfaces, also coaxial with the pivot for effective "kissing off" of the parts. The movable mold is detented in one of eight different positions, in one-degree increments. Another embodiment produces solid-headed irons with selected different lie angles of the hosel, but with only one core piece, which is in the hosel mold.

32 Claims, 3 Drawing Sheets

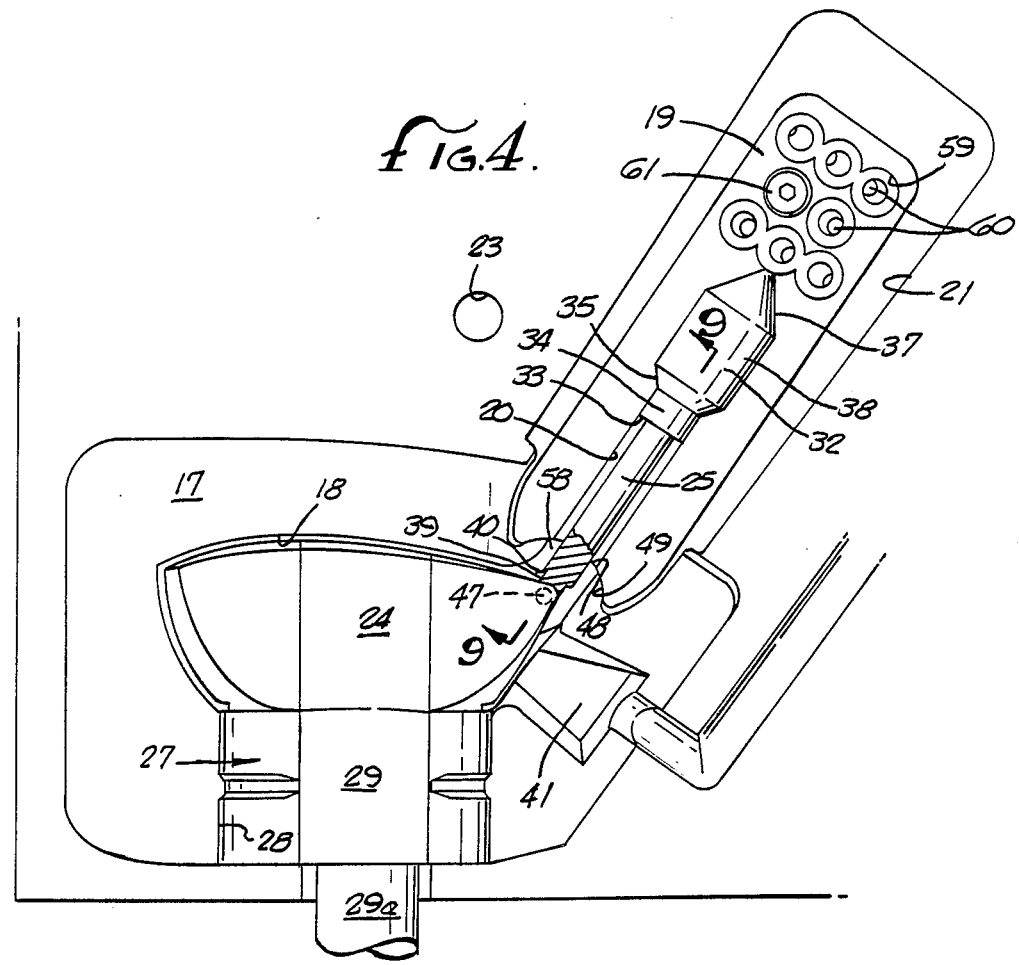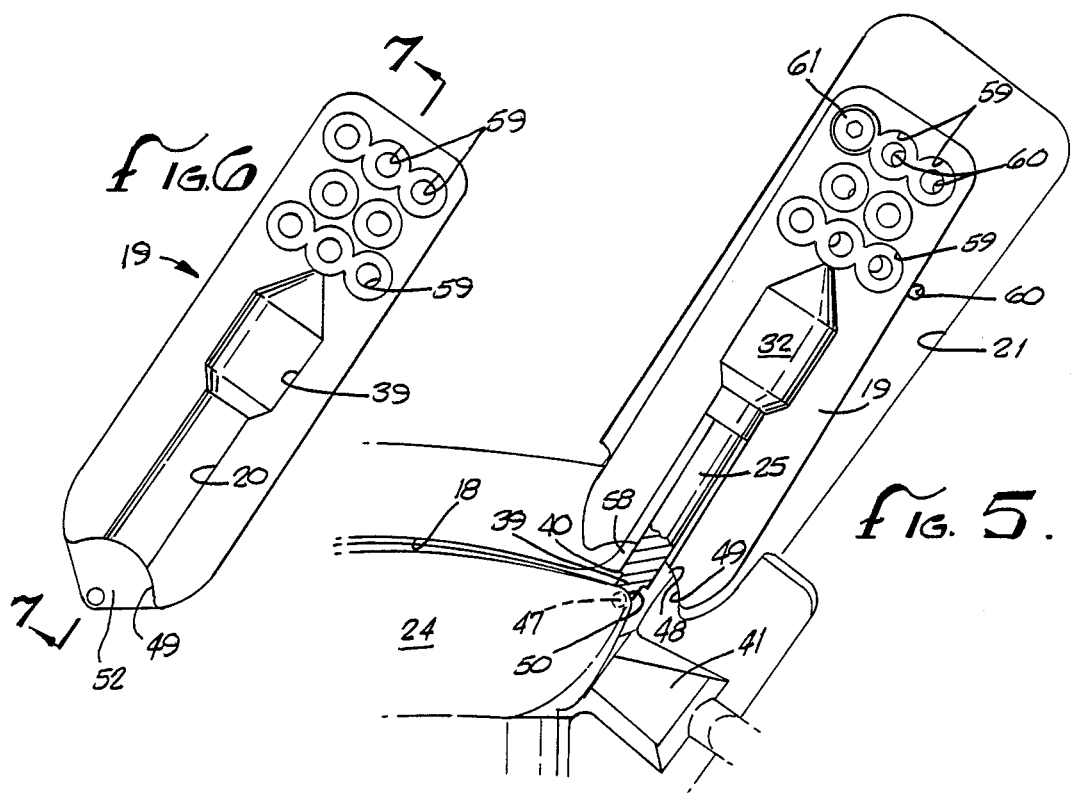

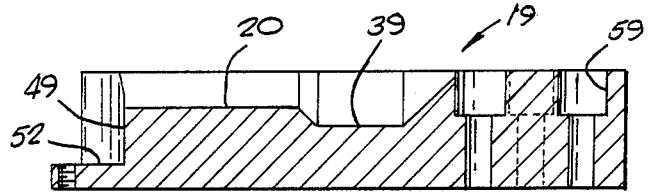
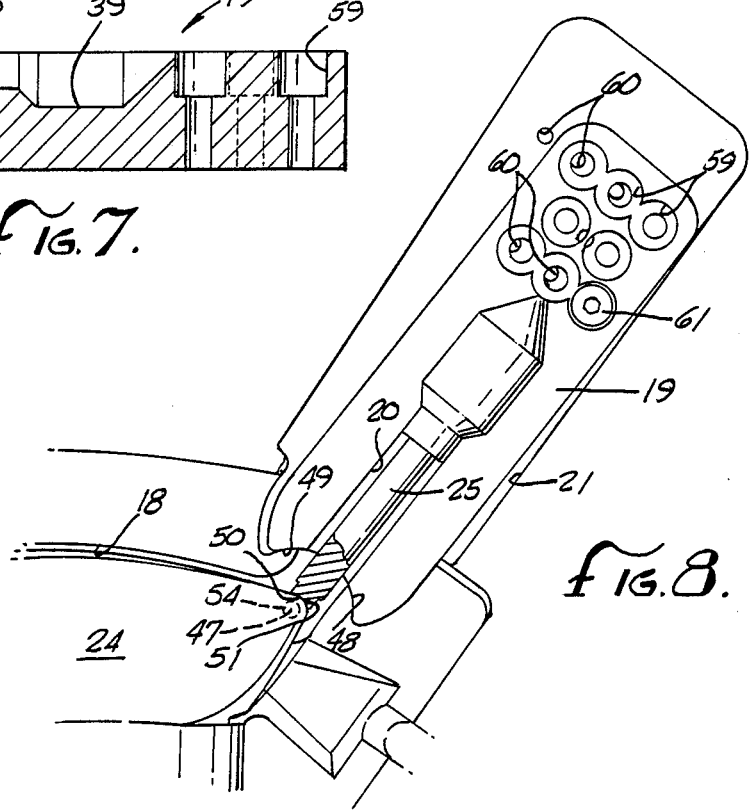
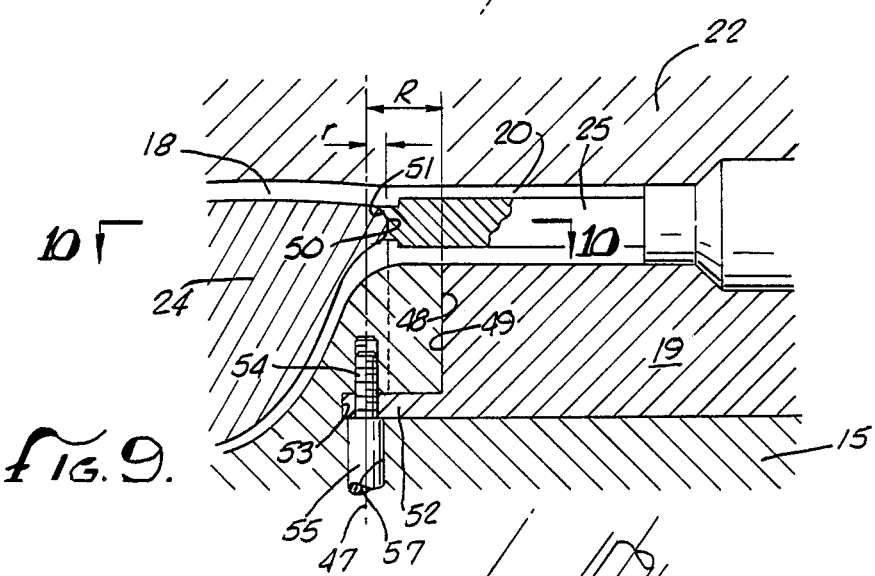
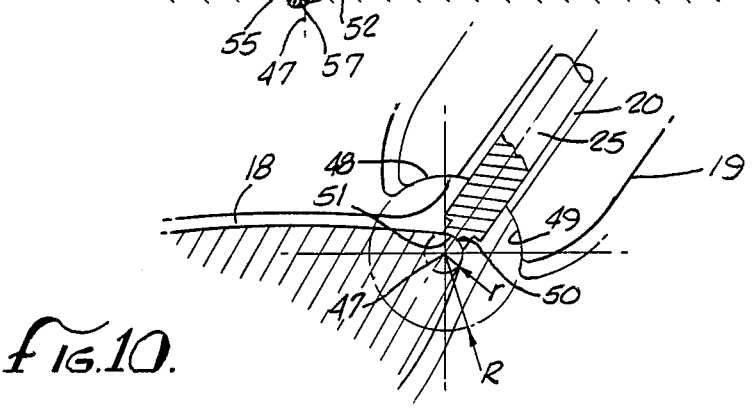

METHOD AND APPARATUS FOR MOLDING GOLF CLUB HEADS

BACKGROUND OF THE INVENTION

This invention relates generally to the molding of articles of manufacture, and relates more particularly to the molding of golf club heads composed of metal or other materials. The invention has particular utility in the molding of golf club heads composed of wax, as patterns or master models for use in the so-called "lost wax" process of molding, also called "investment casting". The terms molding and casting are interchangeable for the purposes of this invention.

A golf club comprises, in general, a head that may be composed of wood, metal or other suitable material, including plastic, and an elongated handle formed by a shaft that is connected at one end to the head and has a grip at the other end. The shaft typically is attached to the head in a bore formed in a tubular neck or ferrule that projects upwardly at a selected angle relative to the head and relative to the hitting surface or "face" of the club. The connection between the head and the shaft sometimes is referred to as the "hosel".

The basic types of clubs are "woods" and "irons", terms derived from the traditional materials that were used in the construction of their heads, and putters, for shots on the greens. The so-called woods are the driver and the fairway clubs having relatively large, thick heads. A relatively recent development in this area is the so-called "metalwood", in which the head has the shape of a traditional wood but formed of metal, molded in hollow form and often filled with plastic for "feel" and sound-deadening purposes. Examples of metalwoods are shown in U.S. Pat. Nos. 4,214,754 and 4,417,731.

The so-called irons have blade-like metal heads, which may be composed of steel or aluminum and usually are substantially solid. The irons have faces that are tilted at different "loft" angles in the normal hitting attitude of the head, and generally are used for shorter shots or more difficult "lies", for example, when the ball is in longer grass, in sand, or otherwise affected by its surroundings. Examples of irons are shown in U.S. Pat. Nos. 2,931,098 and 4,630,825. Putters, regarded as another class of clubs, have heads with faces that are substantially vertical in the normal hitting attitude of the club head.

The dynamics of golf, between the swinging club and the golf ball that is stationary until the impact of the high-speed club head, are much more complex than might be thought by a person unfamiliar with golf club design. The normal back stroke commences with the underside or "sole" of the club substantially flat on the ground, and the face of the club behind the ball and inclined upwardly and rearwardly at a loft angle, between the face and an imaginary vertical plane, that depends upon the particular club. For example, the usual loft angle of a number "5" iron is between thirty and thirty-four degrees, and the usual loft angle of a number "1" wood, or driver, is eight to twelve degrees. For a putter, there is no significant incline.

Another important angle in golf club heads is the angle between the shaft and the club head, called the "lie angle". When the underside of the club is on the ground in the proper hitting attitude, the lie angle is the angle at which the handle is inclined upwardly from the ground toward the golfer, and is established by the angle of the neck or hosel relative to the club head. Standard lie angles or ranges of such angles are prescribed for different clubs, with prescribed variations for mens' and womens' clubs and for variations from standard lengths of shafts. For example, a standard lie angle for mens' drivers of standard length (i.e., 43 inches) is fifty-five degrees, with standard variations in the range of fifty-one degrees to fifty-seven degrees. For a standard mens' "2" iron (39 inches long), the standard is fifty-six degrees and the range is fifty-two degrees to fifty-eight degrees. Standard variations provide so-called "flat" or "upright" lies, according to the preference of particular golfers, and such preferences may vary with a golfer's size, stance or stroke. Shaft flex during the stroke also affects the actual lie angle at the moment of impact.

The so-called "face angle" of a wood is the angle of the face of the club head relative to the intended direction of flight of the ball, and may be "square" or "straight" (ninety degrees to the line of flight) or slightly off "square" in either direction for an "open" or a "closed" face. Also, irons have either "bounce" or "scoop" sole angles, which correspond to the face angles of woods. These also are variables in the design of golf clubs.

In custom-made clubs, lie angles and other angles can be adapted to the preference of the customer, but with a significant increase in cost over the cost of mass-produced clubs. Such variations have been accomplished by providing different molds to produce club heads with hosels disposed at the various angles relative to the bodies of the clubs, or by producing club heads with standard angles and then bending the hosels to "personalize" the clubs. Such bending of hosels in metalwoods is mentioned in Pat. No. 4,214,754 as an adjustment for both loft and lie angles. A more detailed description of bending procedures and equipment is contained in "Golf Club Design, Fitting, Alteration and Repair", published by Ralph Maltby Enterprises, Inc. (2d. Ed. 1982).

The bending of club heads to vary loft and lie angles avoids the expense of providing separate tooling for producing each variation, but has a number of disadvantages. Bending inherently lacks precision and can weaken the metal or other material that is bent, so there is a serious risk of breakage, either during the bending process or later during use of the club. The time and equipment required add to the cost of the clubs, and considerable skill is required to achieve optimum results. Finally, the bending of a hosel to change any angle in the club head may inadvertently affect other angles in a manner that significantly affects the performance of the club.

As a practical matter, manufacturers have chosen either to produce a given mass-produced club with standard preselected angles, including a single lie angle, or to provide the standard club with a limited number of different lie angles, typically three, produced from three sets of molds, or from one basic mold and different mold inserts for adapting the basic mold to form hosels at the different angles. Variations from the standard clubs so provided are left to the "custom" market or to the bending of standard clubs.

The present invention provides a novel molding method and apparatus for selectively varying the angles of the shaft relative to the club body as a part of the molding of the club head or the pattern or master for the club head.

SUMMARY OF THE INVENTION

In the method and apparatus of the present invention, two molds are supported in side-by-side relation with cavities in the molds communicating with each other and for relative angular movement to position the cavities in different angular relationships. The molds have abutting surfaces which meet around the communicating portions of the mold cavities and maintain the cavities in effective communication in the different positions of the molds. When hollow parts are to be molded, the molds have core pieces which also maintain an effective meeting relation in the different positions. Thus, golf club heads can be produced in one set of molds with the bodies and hosels of the clubs in different selected angular relations.

In the preferred embodiments shown and described herein, which is intended primarily for use in producing patterns for the "lost wax" process of investment casting, a first mold defines a mold cavity in the exterior shape of the body of a club head with an opening in the mold corresponding approximately to the junction of the body with the neck or hosel of the head, and a second mold defines a cavity that corresponds to the exterior of the hosel and has an opening at one end that opens into the first cavity, thereby forming a combined molding cavity for the entire club head. The hollow interior of the hosel is formed by a core pin that is supported in spaced relation with the wall of the second cavity and projects into the first cavity. Around the communicating openings, the two molds have abutting arcuate surfaces that are complementary in curvature and fit snugly but slidably together, thus remaining in the same meeting relationship in different angular positions of the molds. When a hollow club head is to be molded, as in a metalwood, a core piece in the first cavity defines the interior of the body, and the two core pieces also have complementary curved abutting surfaces for remaining in a smooth and effective meeting relationship in the different angular positions. These surfaces preferably are part-spherical in shape, one being convex and fitting snugly and slidably in the other, which is concave.

The illustrative molding apparatus has a club body cavity formed in a mold base, with a branch of that cavity in the shape of the annular end portion or base of the hosel and with a recess in the mold base alongside the branch cavity for receiving and movably supporting the second mold. The second mold defines the hosel cavity and includes a core pin for forming the hollow interior of the hosel and extending through an open end of the second mold into the branch cavity in the first mold. The second mold is pivoted on the mold base to turn about an axis that extends through the first cavity adjacent the juncture of the hosel and the club body.

An important feature of the preferred embodiment of the invention is the provision of arcuate abutting surfaces on the two molds that are complementary in curvature and coaxial with the mold pivot for smooth sliding and tight and effective meeting engagement in the different angular positions of the molds. The opening into the branch cavity of the first mold preferably is made larger than the adjacent end of the opening into the cavity of the second mold so that the smaller opening remains in full communication with the larger opening throughout a selected range of movement. This provides for optimum molding of hosel angles in a range including a central standard or medium angle, and variations in opposite directions from the standard, such as four degrees in one direction and three in the other, as has been the practice with lie angles. The present invention also provides for positioning the molds for selected steps in the available range, such as one degree increments.

Other aspects and advantages of the present invention will become apparent from the following detailed description, taken in conjunction with the accompanying drawings.

BRIEF DESCRIPTION OF THE DRAWINGS

FIG. 4 is a partial top view of the molding apparatus of FIG. 3 after insertion of core pieces in the two molds;

FIG. 5 is a partial view of parts in FIG. 4 with the molds in relatively moved positions;

FIG. 6 is a top view of the movable block forming the second mold;

FIG. 7 is a cross-sectional view taken along line 7—7 of FIG. 6;

FIG. 8 is a view similar to FIG. 5 shown in another moved position of the molds;

FIG. 9 is an enlarged fragmentary cross-sectional view taken substantially along line 9—9 of FIG. 4 and showing the core pin partly in side elevation and adding the top piece of the molding apparatus which closes the molds and defines the upper portions of the mold cavities;

FIG. 10 is a fragmentary cross-sectional view taken substantially along line 10—10 of FIG. 9, with different angular positions of the end of the movable mold block shown in phantom lines;

FIG. 11 is a partial view similar to a portion of FIG. 4 but showing a modified embodiment of the molding apparatus;

FIG. 12 is an enlarged fragmentary cross-sectional view taken substantially along line 12—12 of FIG. 11, with the core pin partly in side elevation, and showing the top piece of the molding apparatus; and FIG. 13 is a fragmentary cross-sectional view taken substantially along line 13—13 of FIG. 12 with different angular positions of the movable mold block shown in phantom lines;

FIG. 14 is a partial top view similar to FIG. 4 but illustrating a third embodiment of the molding apparatus of the invention, for use in molding golf club heads for irons;

FIG. 15 is a front elevational view of a club head or wax pattern for an iron molded in accordance with the present invention with a central angular position of the hosel shown in full lines, with a portion broken away and shown in cross-section for clarity, and with variations in opposite directions for different lie angles shown in broken lines; and FIG. 16 is an end elevational view of the iron in FIG. 12, with variations in the hosel position for loft angle in opposite directions from a central position shown in broken lines.

DETAILED DESCRIPTION (FIGS. 1-10)

Figures 1, 2:
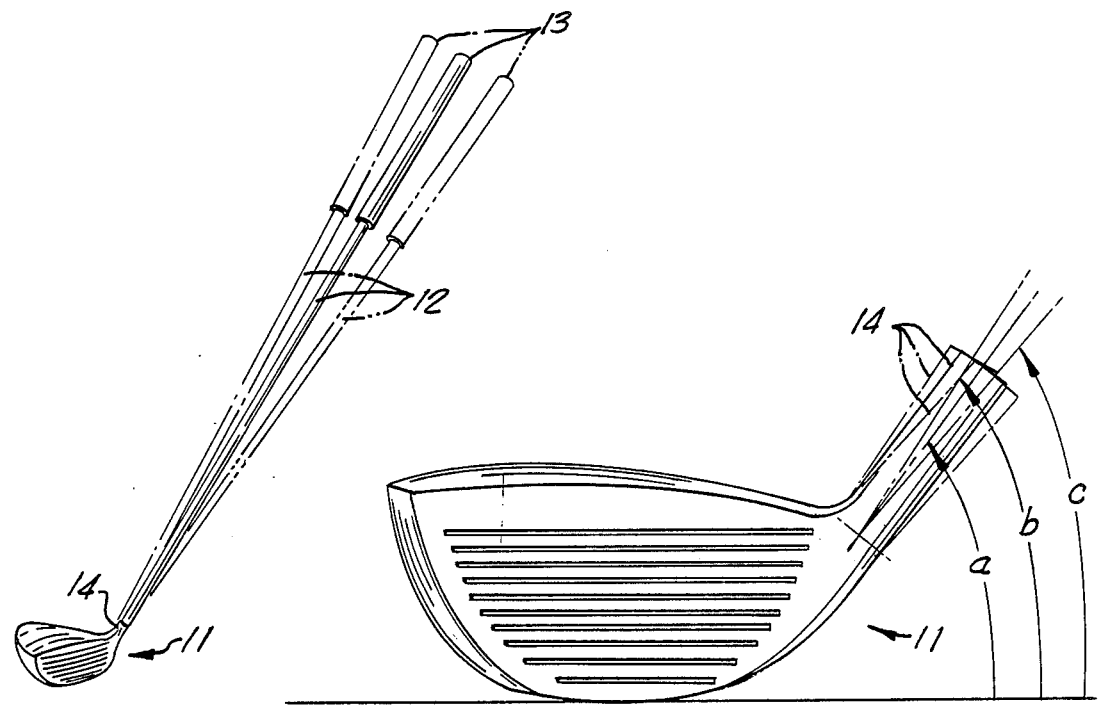
FIG. 1 is a perspective view of an illustrative golf club head of the metalwood type, with three different handle or shaft positions shown in broken lines to illustrate variations in the lie angle of the golf club in accordance with the present invention.
FIG. 2 is an enlarged front elevational view of the metalwood golf club head (representing both the wax pattern and the eventual metal head) with a central position of the hosel shown in full lines and variations in opposite directions for different lie angles shown in broken lines.
Figure 3:
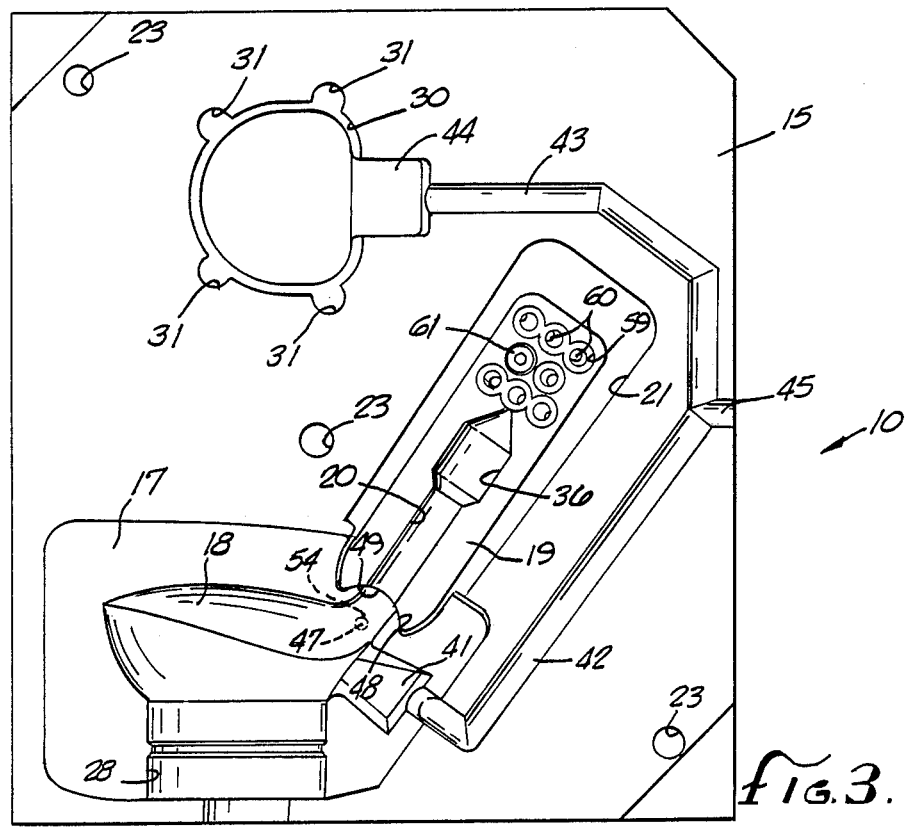
FIG. 3 is a top view of a molding apparatus for molding the metalwood golf club head of FIG. 1 in accordance with the present invention, including the lower halves of the first and second molds, before insertion of core pieces.

As shown in the drawings for purposes of illustration, the invention is embodied in a molding apparatus, indicated generally by the reference number 10 in FIGS. 3 and 9, for molding golf club heads 11 of the metalwood type (FIGS. 1 and 2). Such a head is mounted on the end of a shaft 12 that has a grip 13 at the opposite end, the shaft being received in the bore of a tubular neck or hosel 14 that is disposed at a selected angle to the body of the club head to form the lie angle of the club. Three different lie angles a, b and c are illustrated in FIGS. 1 and 2.

The molding apparatus in accordance with the present invention comprises a mold base 15, typically a large metal block, that has a first mold 17 recessed into it to define a first cavity 18 in the shape of the exterior of the body of the club head, and a second mold 19 recessed into it to define a second cavity 20 in the shape of the exterior of the hosel 14, which typically is circular in cross-sectional shape. The open cavities for a metalwood club head are shown in FIG. 3, the body cavity 18 being formed in a mold insert 17 that is recessed into the base 15 and the hosel cavity 20 being formed in an elongated mold block that is loosely received in a larger recess 21 in the mold base, alongside the mold insert 17.

It is to be understood that the parts shown in FIG. 3 constitute the lower half of a molding apparatus, and that the mold cavities are to be covered and completed by an upper mold block 22, partially shown in FIG. 9, which completes the upper sides of the mold cavities in a basically conventional way, being aligned with the lower mold block 15 by dowel pins (not shown) fitted in holes 23 which tie the two blocks together during use, also in a conventional manner.

Since both the body and the hosel of the metalwood club head 11 are hollow, both mold cavities 18 and 20 receive core pieces 24 and 25 (FIGS. 4, 5, 8, 9 and 10) for defining the interior surfaces of the head. The core piece 24 (see FIG. 4) has approximately the same shape as the cavity 18, but is smaller by the thickness of the walls of the club head that is to be molded, so as to leave a space between the core piece and the wall of the body cavity. A specially shaped positioning piece 27, called a "core index", is joined to the underside of the core piece 24 and extends out of the cavity along a similarly shaped passage 28 (FIG. 3), called a "window", to hold the core piece in precisely the correct position in the cavity. In the finished club head, this forms an opening (not shown) in the underside of the club head that will be closed by a "sole plate" (not shown) that has the same shape as the cross-sectional shape of the core index. The core index is formed in several pieces that are removed one by one through the side of the mold block after the article has been molded. A central piece 29 (FIG. 4) is withdrawn first, permitting the other pieces to collapse inwardly for removal through the space that is left by the central piece, which has a handle 29a for gripping during removal. This is conventional, and is well known to those skilled in the art.

For convenience, the sole plate may be molded in the same molding apparatus 10, in a cavity 30 (FIG. 3) in the base 15 having edge-tab recesses 31 for forming tabs of the same shape on the sole plate for use in mounting the plate on the underside of the club head. This also is conventional, and is illustrated only generally herein to provide a clearer understanding of the overall procedure.

The core piece 25 for the hosel cavity 20 is a cylindrical pin that is smaller than the cavity by the thickness of the wall of the hosel (see FIG. 4), thereby leaving a space in which the hosel will be molded. To hold the pin in the proper position in the cavity, an enlarged, specially shaped "index" head 32 is formed on one end of the pin. Herein the head has a shoulder 33 on a short cylindrical stud 34 that fills the end of the hosel cavity and forms the end of the hosel, and has tapering surfaces 35 and 37 on opposite sides of a relatively large cylindrical section 38, all for fitting precisely in a positioning recess 36 (FIGS. 3 and 6) of the same shape, to suspend the core pin in spaced, coaxial relation with the wall of the hosel cavity 20. The inner end of the core pin, which lies inside the body mold 18 near the juncture of the hosel and the body, has a short section 39 of reduced diameter which will produce a shoulder at 40 in the interior of the molded hosel for engagement with the end of the shaft 12.

As best shown in FIG. 3, the molten material to be cast in the molding apparatus 10 is introduced through a gate 41 that opens into one side of the mold cavity 18 and receives the material through a passage 42, called a "runner", defined by a channel that is formed between the two blocks of the mold. Herein, a second runner 43 leads to a gate 44 that opens into the sole plate cavity 30 to mold a sole plate at the same time that a golf club head is molded. The connection for introduction of molten material into the runners is a port 45 in the side of the base 15.

When patterns are being produced for use in the "lost wax" investment casting process, the molten material being molded is a liquid wax that hardens upon cooling, and which then is coated to form a shell from which the wax can be melted to form a precise mold cavity. Hot metal is poured into such cavities to form finished products that are precise copies of the pattern. This is a well known and conventional molding process for producing complex shapes.

In accordance with a primary aspect of the present invention, the two molds 17 and 19 defining the body and hosel cavities 18 and 20, respectively, are supported on the base 15 for relative angular movement in a manner that produces golf club heads 11 with shaft-receiving bores and hosels 14 (FIG. 2) that are disposed at different lie angles in different positions of the molds. For this purpose, the hosel mold 19 is supported in the recess 21 for back-and-forth pivotal movement in the plane of adjustment for the lie angle, a vertical plane when the golf club head 11 is in the proper attitude for striking the golf ball, as illustrated in FIGS. 1 and 2. This pivotal motion is about a pivotal axis 47 that passes through the juncture of the hosel and the body, and the two molds have abutting arcuate surfaces 48 and 49 that are coaxial with this pivotal axis, providing smooth meeting engagement of the molds in the different angular positions of the molds. Further, the two core pieces 24 and 25 also have arcuate abutting surfaces 50 and 51 that are coaxial with the pivot thereby insuring smooth meeting engagement, or "kissing off", of the internal mold elements as well. These surfaces herein are part-spherical, the illustrative core pin 25 having a concave recess 51 in its inner end that engages a convex surface 50 on the adjacent end of the core piece 24, inside the juncture of the hosel and the body.

As can be seen in FIGS. 6, 7 and 9, the block 19 defining the hosel mold cavity 20 is of elongated, generally rectangular shape and has a concave end surface 49 for abutting against a convex side surface 48 of the mold insert 17, at one end of the recess 21. The mold block 19 preferably tapers slightly toward this end, and has a toe-like extension 52 (FIGS. 6, 7 and 9) on its lower side that projects into an undercut notch 53 (FIG. 9) beneath the concave surface 49 and across the pivotal axis 47. This axis is defined by a pivot pin having a threaded end 54 that extends upwardly through the toe-like extension 52 and into the mold insert 17, above the notch and generally beneath the part-spherical surfaces on the core pieces. The body 55 (FIG. 9) of the pivot pin is rotatably received in a bore 57 in the mold insert below the notch, thereby mounting the hosel mold 19 for swinging about the axis 47.

The axis 47 in the illustrative molding apparatus 10 extends through the center of curvature of the part-spherical core surfaces 50 and 51, which are formed to have a radius indicated in FIGS. 9 and 10 by the letter r. This axis also passes through the center of curvature of the arcuate surfaces 48 and 49 of the molds 17 and 19, which are formed to have a larger radius indicated by the letter R. It will be seen that the radius r of the illustrative spherical surfaces is relatively short,, keeping the meeting area of the two core pieces close to the pivotal axis 47. This is desirable because it reduces the amount of lateral offset of the core pin 25 that results from a given amount of angular movement. A satisfactory illustrative dimension for the radius r in a typical metalwood is 0.312 of an inch.

Similarly, keeping the arcuate mold surfaces 48 and 49 relatively close to the pivotal axis 47 reduces the amount of lateral offset that occurs at this meeting area from a given amount of angular movement. On the other hand, providing a short annular base section of the hosel on the body mold is desirable so that the lateral offset occurs a short distance from the body, permitting easy clean-up operations on the molded parts. This annular base section is formed in a branch portion 58 of the body cavity 18, which is annular in shape when the core pin is in place.

To contribute further to the ease of clean-up and to avoid thinning of the hosel wall, the branch portion 58 preferably is made slightly oversize (see FIG. 4) so that the base section of the hosel wall will be slightly thicker than the free end portion of the hosel. In FIG. 4, the hosel cavity 20 is centered on the base section 58, in the "standard" lie angle position, and a slight ridge will be formed entirely round the hosel as a result of the oversized base section. In the angular relation shown in FIG. 5, the hosel cavity is offset upwardly, for an "upright" lie angle, and the ridge will be more pronounced beneath the hosel. In FIG. 8, the hosel cavity is offset downwardly for a "flat" lie angle, and the ridge will be more pronounced on the upper side of the hosel. By correlating the increased thickness of the hosel base with the maximum lateral offset of the adjacent end of the hosel cavity, the molds can be designed to align the hosel cavity 20 and the hosel base cavity 58 on one side or the other in the maximum offset conditions to be provided by a given set of molds.

The illustrative molding apparatus 10 is designed to provide eight different lie angles, including the standard, upright and flat lie angles shown in FIGS. 4, 5 and 8, each angular step in the eight positions being one degree. For this purpose, eight different pairs of detent holes 59 and 60 are formed, respectively, in the free end portion of the hosel mold block 19 and in the base 15 under the block, to receive a headed detent pin 61 when the holes of the pair are aligned. One set of detent holes is aligned in each of the eight different angular positions of the molds, and the pin 61 locks the molds in that particular alignment for the molding operation. Three different representative positions of the detent pin are shown in FIGS. 4, 5 and 8. When the pin is removed, the block can be swung freely into any selected angular position of the eight that are available, whereupon insertion of the pin into the then-aligned set of detent holes will lock the molds in that position.

With the molds 17 and 19 pinned in a selected position and the core pieces 24 and 25 in place, the mold block 22 is placed on top to complete and close the mold cavities 18 and 20 and the molding apparatus is ready for the molding operation. Then molten material is shot into the molds through the port 45 and the runner 42 and the gate 41, filling both mold cavities around the core pieces. When the molten material has hardened, the molds are opened and the core pieces are pulled—the core pin 25 endwise from the hosel cavity 20 and the core 24 downwardly through the underside of the club head, the central section first to permit collapse and removal of the entire core. Many thousands of wax masters may be produced in a molding apparatus of this kind, with different selected lie angles, as desired. Whenever a different lie angle is desired, the mold block 19 is released by removal of the pin 61, moved angularly to a new position, and then re-pinned in that position.

It should be noted that the molding apparatus has other uses as well, including the molding of resin masters with hosels at different angles. Such masters, after a minor amount of clean-up, can themselves be used in the production of production molds or mold inserts for producing golf clubs with different hosel angles in other, conventional tooling. Moreover, the body mold 17, without the core piece 24, can be used to mold solid heads for "woods" composed of any suitable moldable material, including plastic and advanced composite materials.

It should be noted that the design of the core pieces 24 and 25 and the part-spherical surfaces 50 and 51 can be combined in an embodiment of the mold apparatus that uses, instead of the pivoted hosel mold 19, a set of interchangeable inserts (not shown) that have different fixed angular positions, for example, the same positions as the three shown in FIGS. 4, 5 and 8. With such inserts, a selected insert can be placed in the mold base and the core pin 25 can be placed in that insert. The core pin then will engage the part-spherical surface on the core body 24 in one of the three different angular relations, in the same manner as is shown in FIGS. 4, 5 and 8. The arcuate surfaces 48 and 49 are not necessary in this molding apparatus, because the inserts do not rotate.

DESCRIPTION OF THE FIRST ALTERNATIVE EMBODIMENT (FIGS. 11–13)

Shown in FIGS. 11–13 is an alternative embodiment of the molding apparatus, indicated generally by the reference number 10′, in which corresponding parts are shown with corresponding, primed reference numbers. This embodiment is the same in all respects as the first embodiment except that the part-spherical surfaces 50′ and 51′ on the core pin 25′ and the body core piece 24′ are reversed, the end 50′ of the core pin 25′ being convex and fitting rotatably into a concave recess 51′ in the body core piece 24′. Functionally, this is substantially the same as the part-spherical surfaces of the first embodiment, except that the pivotal axis 47′ now extends through the end of the core pin.

DETAILED DESCRIPTION OF THE SECOND ALTERNATIVE EMBODIMENT (FIGS. 14-16)

Shown in FIGS. 14-16 is another alternative embodiment of a molding apparatus, indicated generally by the reference number 10″, in which corresponding parts are shown with corresponding double-primed reference numbers. This embodiment produces golf club heads 11″ for irons, and also is designed to produce such heads with selected variations in lie angles. Structure and functions that are similar to those in the other embodiments will be described only in sufficient detail to focus on the relevant differences.

It will be seen in FIG. 14 that the body mold 17″ has a cavity 18″ in the shape of the head of an iron, with a gate 41″ at the area 70 of the cavity for forming the toe 71 of the iron and a runner 42″ leading into the cavity from the left-hand side of the base 15″. Because the iron is not hollow, there is no core piece in the body mold, which is to be closed by a cover piece like the upper mold block 22.

The hosel mold 19″ is essentially the same as the previous hosel molds, except that the core pin 25″ does not have a part-spherical end surface. The end 72 of this pin is received in a branch 58″ of the body cavity 18″ for forming the hosel base, and itself defines the end of the interior passage in the hosel. This passage is a blind bore, which may be extended into the body of the club head as far as is desired.

As in the other embodiments, a pivot pin 54″ (FIG. 14) for the hosel mold 19″ is located on the mold base 15″ to define a pivotal axis 47″ adjacent the juncture of the club body and the hosel, and supports the hosel mold 19″ for pivoting in the plane of adjustment of the lie angle of the club head 11″. The central and extreme hosel positions in the available range of adjustment of the lie angle are shown in full and broken lines in FIG. 15, as in the first embodiment.

The molding apparatus 11″ may be used to produce wax patterns for use in the lost wax process, and also may be used for the direct molding of club heads composed of other materials, such as plastic or advanced composites. The principles of the invention are applicable to injection molding and pressure molding, as well as to produce patterns for investment casting.

FIG. 16 shows the end view of the iron 11″ to illustrate the relationship of the hosel 14″ to the plane of the face 73 of the iron, which determines the loft angle of the iron. Shown in broken lines in FIG. 16 are variations in the angle of the hosel relative to the plane of the club face 73 which can be obtained in tooling of the type described herein, after turning the plane of movement of the hosel mold 19″ ninety degrees relative to the body mold 17″. With the hosel mold mounted on the mold base 15″ for movement in a plane normal to the plane of the club face, variations of the type shown in FIG. 16 are possible. This modification in the molding apparatus not only adapts it to provide small incremental changes in the loft angle, but also can be used to produce masters for the production of clubs of different loft angles within the range of permissible angular adjustment.

CONCLUSION

From the foregoing, it will be evident that the molding apparatus and method of the present invention are capable of producing golf club heads with hosels and shaft-mounting bores that are disposed at different selected angles relative to the club bodies, for adjustment of the various angular relationships of the parts of the club head in a precise fashion during the molding process, without the limitations of prior adjustment methods. It also will be evident that, while three embodiments of the invention have been illustrated and described, various modifications and changes may be made without departing from the spirit and scope of the present invention.

I claim as my invention:

1. Apparatus for molding wax patterns for metalwood golf club heads having hollow bodies and hosels comprising annular hosel bases joined to the bodies and tubular necks projecting from the bases at selected lie angles relative to the club bodies, said apparatus comprising:

a mold base;

a first mold on said mold base having formed therein a first cavity in the shape of one side portion of the club head, and a branch cavity on one side of said first cavity in the shape of one side portion of the annular hosel base, said first mold having a first side surface through which an end of said branch cavity opens;

a second mold in the form of a block having formed therein a second cavity in the shape of one side portion of the tubular neck, said block having a second side surface through which said second cavity opens;

said mold base having a recess larger than said block beside said first mold on said one side of said first cavity, said block being disposed in said recess with said second side surface abutting against said first side surface and the end of said second cavity aligned with the end of said branch cavity;

a pivot on said mold base having an axis extending through said first cavity adjacent the juncture of said branch cavity, said pivot being connected to said second mold to mount the same in said recess for pivotal movement relative to said first mold;

said first and second side surfaces being arcuately curved and coaxial with said pivot to slide closely together as said second mold pivots relative to said first mold;

a body core supported in said first cavity in spaced relation with the walls of the first cavity to define a hollow interior for the golf club head;

a core pin supported in said second cavity in spaced relation with the walls of the second cavity to define a tubular neck for the golf club head, said core pin projecting out of said second cavity and into said branch cavity and having an end abutting against said body core;

said body core and said core pin having part-spherical abutting surfaces that are coaxial with said pivot and said first and second side surfaces to slide closely together as said second mold pivots relative to said first mold;

means for securing said second mold in different selected angular positions in said recess;

and cover means for completing and closing said cavities.

2. Molding apparatus as defined in claim 1 wherein said second mold is movable between at least three positions, a first position in which said branch cavity and said second cavity are generally longitudinally aligned at a first lie angle, a second position which is approximately three degrees in one direction from said first position, and a third position which is approximately four degrees in the opposite direction from said first position.

3. Molding apparatus as defined in claim 1 in which the opening from said branch cavity through said first side surface is larger than the opening from said second cavity through said second side surface, whereby said openings remain in full communication during movement through a selected angular range.

4. Molding apparatus as defined in claim 1 wherein said mold base has an undercut notch underlying said branch passage, and said second mold has a toe-like projection which extends into said undercut, said pivot comprising a pin pivotally connecting said second mold to said base in said undercut notch.

5. Molding apparatus as defined in claim 1 wherein said part-spherical surfaces are positioned in said first mold at the juncture of said first cavity and said branch cavity.

6. Apparatus for molding patterns for gold club heads and for molding golf club heads, wherein the golf club head has a body with a face on one side and a neck projecting from one side of said body at a selected angled relative to said face, said apparatus comprising:

a first mold defining a first cavity having a shape that corresponds to the exterior of said body and having a first opening on the side corresponding to said one side of said body adjacent said neck;

a second mold defining a second cavity having a shape that corresponds to the exterior of said neck and having a second opening that corresponds to the end portion of said neck adjacent said body; and means supporting said first and second molds with said first and second openings aligned and communicating between said first and second cavities, thereby to form a combined molding cavity for a club head and a neck, said means also supporting said first and second molds for relative angular movement to different positions in which said second cavity extends from said first cavity at different selected angles with said face, for molding of golf club heads with necks at different selected angles with said face.

7. Apparatus for molding golf club heads as defined in claim 6 wherein said first and second molds are supported in side-by-side abutting relation and have abutting surfaces surrounding said first and second openings, said abutting surfaces being arcuate and complementary in curvature and fitting snugly but slidably together to remain in substantially the same meeting relationship in different angular positions of said molds.

8. Apparatus for molding golf club heads as defined in claim 7 wherein said means supporting said first and second molds include a base, and a pivot on said base that is coaxial with said abutting surfaces, said pivot supporting one of said molds for angular movement on said base relative to the other mold.

9. Apparatus for molding golf club heads as defined in claim 6 further including first and second core pieces in said cavities for forming a golf club with a hollow body and a hollow neck, said first core piece being disposed in said first cavity in spaced relation with said first mold and having a first end adjacent said first opening, and said second core piece being disposed in said second cavity in spaced relation with said second mold and having a second end adjacent said second opening, said core pieces being supported in said molds with said ends in abutting relation and to move against each other during said relative angular movement thereby to form golf club heads with necks that open into hollow bodies in different angular positions.

10. Apparatus for molding golf club heads as defined in claim 9 wherein said means supporting said first and second molds include a base, and a pivot on said base that supports one of said molds for angular movement on said base relative to the other mold.

11. Apparatus for molding golf club heads as defined in claim 10 wherein said first and second ends have arcuate, complementary surfaces that are coaxial with said pivot and fit snugly but slidably together to remain in substantially the same meeting relationship in different angular positions of said molds.

12. Apparatus for molding golf club heads as defined in claim 8 further including first and second core pieces in said cavities for forming a golf club with a hollow body and a hollow neck, said first core piece being disposed in said first cavity in spaced relation with said first mold and having a first end adjacent said first opening, and said second core piece being disposed in said second cavity in spaced relation with said second mold and having a second end adjacent said second opening, said core pieces being supported in said molds with said ends in abutting relation and to move against each other during said relative angular movement thereby to form golf club heads with necks that open into hollow bodies in different angular positions, said first and second ends being arcuate and complementary and fitting snugly but slidably together, and being coaxial with said pivot and said abutting surfaces thereby to maintain the parts defining the first and second cavities in substantially the same meeting relationship in different angular positions of said molds.

13. Apparatus for molding golf club heads as defined in claim 12 wherein said first cavity includes a branch portion of generally circular cross-sectional shape for forming an annular base for said neck, and wherein said second cavity for forming the remainder of the neck also is of generally circular cross-sectional shape, said branch portion being of larger diameter than said second cavity to maintain full communication between said branch portion and said second cavity during angular movement within a predetermined range of relative angular movement.

14. Apparatus for molding golf club heads as defined in claim 13 wherein said range of angular movement is on the order of eight degrees.

15. Apparatus for molding patterns for golf clubs heads and for molding golf club heads, wherein the golf club head has a body and a tubular neck projecting from one side of said body at a selected angle relative to the body, said apparatus comprising:

a first mold having a first cavity in the shape of a golf club body and having a first opening on one side adjacent the juncture with the neck;

a second mold having a second cavity in the shape of the neck for the golf club body, said second mold having a core pin therein for forming the hollow interior of the tubular neck and having a second opening at one end of said second cavity;

and means supporting said molds such that said one side and said one end are in an abutting relationship with said first and second openings aligned and communicating, said means also supporting said molds for relative angular movement about a pivotal axis to different positions relative to one another;

said core pin extending to the juncture of said tubular neck with said body.

16. Apparatus as defined in claim 15 wherein said core pin extends beyond said second cavity and into said first cavity.

17. Apparatus as defined in claim 16 wherein said molds have arcuate abutting surfaces that define said openings, said surfaces being coaxial with said pivotal axis.

18. Apparatus as defined in claim 17 wherein said first cavity has the shape of an iron golf club head, and said core pin terminates in a free end for defining an end of said hollow exterior within the body of the iron.

19. Apparatus as defined in claim 17 wherein said first cavity has the shape of a metalwood golf club head, and further including a core piece in said first cavity for defining a hollow interior, said core pin and said core piece having arcuate abutting surfaces coaxial with said pivotal axis.

20. Apparatus as defined in claim 19 wherein said arcuate abutting surfaces for said core pin and said core piece are part-spherical complementary surfaces.

21. In an adjustable molding apparatus for directly producing a part or a pattern of the part, said part having first and second components that are joined together in a selected angular relationship, the combination of:

a first mold defining a first cavity having the shape of the first component, and defining a first opening on one side of said first cavity;

a second mold defining a second cavity having the shape of the second component, said defining a second opening on one side of said second cavity;

and means supporting said molds with said first and second openings aligned and communicating between said first and second cavities, said means also supporting said molds for relative angular movement about a predetermined axis to position said cavities in different angular relationships;

said molds having abutting arcuate surfaces around said openings that are coaxial with said predetermined axis for smooth meeting engagement between said molds in different relative angular positions.

22. A molding apparatus as defined in claim 21 further including first and second core pieces in said first and second cavities, respectively, for forming hollow components in said cavities, said core pieces being disposed in abutting relation adjacent said openings and having arcuate abutting surfaces that are coaxial with said arcuate surfaces on said molds and with said axis, for smooth mating engagement between said core pieces in different relative angular positions.

23. A molding apparatus as defined in claim 21 wherein one of said openings is larger than the other opening, and said other opening overlies said one opening in all relative angular positions of said molds.

24. A molding apparatus as defined in claim 21 further including a core piece in one of said cavities for forming a hollow component in said one cavity, said core piece extending through said openings into the other cavity.

25. A molding apparatus as defined in claim 24 wherein the arcuate surfaces on said core pieces are part-spherical in shape, one being concave in curvature and the other being convex.

26. A molding apparatus as defined in claim 24 wherein said first cavity has the shape of a metalwood golf club head and said first core piece has the shape of a hollow interior for said head, said second cavity has the shape of a neck for the club head, and said second core piece has the shape of the interior of the neck, said molds being relatively movable to change the lie angle of said neck relative to said club head.

27. A molding apparatus as defined in claim 23 wherein said first cavity has the shape of an iron golf club head and said second cavity has the shape of a neck for said club head, said core piece being disposed in said second cavity and projecting through said openings into said first cavity.

28. Apparatus for molding patterns for golf club heads and for molding golf club heads, wherein the golf club head has a hollow body and a tubular neck projecting from one side of said body at a selected angle relative to the body, said apparatus comprising:

a base;

a first mold supported on said base and having a first cavity in the shape of a golf club body and having an opening on one side adjacent the juncture with the neck;

a first core piece in said first mold defining a hollow interior for the golf club body;

a set of interchangeable second mold inserts mountable in a preselected position on said base, and each having a second cavity in the shape of a neck for the golf club body, the second cavities of said inserts being disposed at different selected angles relative to said first mold thereby to define necks in different angular relations for said body;

a core pin mountable in each of said interchangeable inserts to form the hollow interior of a tubular neck and to project into said first cavity through said opening and into abutting engagement with said core piece;

said core pin and said core body having part-spherical complementary abutting surfaces, and said mold inserts supporting said core pin in different angular positions about the axis of said part-spherical abutting surfaces.

29. Apparatus for molding patterns for golf club heads and for molding a golf club head, wherein the golf club head has a bore for receiving a shaft, the apparatus comprising:

a mold defining a mold cavity substantially in the shape of the body and having an opening into said cavity on one side thereof;

a core pin projecting into said cavity through said opening to define said bore; and means supporting said core pin for pivotal movement relative to said mold into different angular positions, thereby to form said bore for reception of a shaft at different angles relative to the body of the golf club.

30. The method of molding patterns for golf club heads and for molding golf club heads, wherein the golf club head has a body and a tubular hosel projecting from the body at a selected and variable angle, comprising the steps of:

providing first and second separate mold cavities for the body and for the tubular hosel, respectively, with openings adjacent the portions of the cavities corresponding to the juncture of the body and the hosel;

supporting the second mold cavity alongside the first mold cavity with said openings aligned and communicating between said cavities;

moving the second mold cavity relative to the first mold cavity about a pivotal axis corresponding generally to the juncture of the hosel with the body into different selected angular relationships;

and molding at least one golf club head in each of at least two different angular relationships to produce golf club heads with the hosels projecting from the bodies at the different angles.

31. The method as defined in claim 30 wherein said second mold cavity is moved along a plane of adjustment for the lie angle of the club.

32. The method as defined in claim 30 wherein the first mold cavity is provided to include a base portion of the hosel, and the second cavity is provided to include the remainder of the hosel, and wherein the moving of said second cavity is about a pivotal axis extending through the first cavity at the juncture of the portion for forming the body with the base portion of the hosel.

* * * * *